US009813906B2

(12) United States Patent
John Archibald et al.

(10) Patent No.: US 9,813,906 B2
(45) Date of Patent: Nov. 7, 2017

(54) MOBILE DEVICE TO PROVIDE ENHANCED SECURITY BASED UPON CONTEXTUAL SENSOR INPUTS

(71) Applicant: QUALCOMM INCORPORATED, San Diego (CA)

(72) Inventors: Fitzgerald John Archibald, Ontario (CA); John Schneider, Williamsville, NY (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/539,510

(22) Filed: Nov. 12, 2014

(65) Prior Publication Data

US 2016/0135046 A1    May 12, 2016

(51) Int. Cl.
| H04M 3/16 | (2006.01) |
| H04W 12/06 | (2009.01) |
| H04M 1/725 | (2006.01) |
| H04L 29/06 | (2006.01) |
| H04W 12/08 | (2009.01) |

(52) U.S. Cl.
CPC ......... *H04W 12/06* (2013.01); *H04L 63/0861* (2013.01); *H04M 1/72577* (2013.01); *H04W 12/08* (2013.01); *H04L 63/0853* (2013.01)

(58) Field of Classification Search
CPC .. H04W 12/06; H04L 63/083; H04L 63/0861; H04M 1/72577
USPC ... 455/411, 4, 4.2, 410, 414.1, 456.1–456.3; 726/3
See application file for complete search history.

(56) References Cited

U.S. PATENT DOCUMENTS

| 7,818,395 | B2 * | 10/2010 | Pizano | G06F 21/6245 |
| | | | | 709/217 |
| 8,312,157 | B2 | 11/2012 | Jakobsson et al. | |
| 8,584,219 | B1 | 11/2013 | Toole et al. | |
| 8,660,532 | B2 * | 2/2014 | Conti | G06F 21/32 |
| | | | | 455/404.2 |
| 8,941,466 | B2 * | 1/2015 | Bayram | G06F 21/316 |
| | | | | 340/5.52 |

(Continued)

FOREIGN PATENT DOCUMENTS

| CA | WO 2012083456 A1 * | 6/2012 | ............. A61B 5/117 |
| EP | 2743873 A1 | 6/2014 | |
| WO | 2013154936 A1 | 10/2013 | |

OTHER PUBLICATIONS

International Search Report and Written Opinion—PCT/US2015/056262—ISA/EPO—Dec. 23, 2015.

*Primary Examiner* — Amancio Gonzalez
(74) *Attorney, Agent, or Firm* — Blakely, Sokoloff, Taylor & Zafman

(57) ABSTRACT

Disclosed is a mobile device to provide enhanced security based upon contextual sensor inputs. The mobile device may include: a biometric sensor; a contextual sensor; and a processor. The processor may be configured to: determine an authentication score based upon a biometric input received from the biometric sensor; modulate the authentication score based upon a contextual sensor input from the contextual sensor related to an event; and determine if the modulated authentication score falls below a predetermined threshold. If the authentication score falls below the predetermined threshold, the processor may command that a secondary authentication be performed or the destruction of a biometric template.

30 Claims, 6 Drawing Sheets

(56) References Cited

U.S. PATENT DOCUMENTS

| | | |
|---|---|---|
| 2005/0286746 A1 | 12/2005 | Silvester |
| 2013/0019304 A1 | 1/2013 | Cai et al. |
| 2013/0232542 A1 | 9/2013 | Cheng et al. |
| 2013/0267204 A1 | 10/2013 | Schultz et al. |
| 2014/0143149 A1* | 5/2014 | Aissi ................ G06F 21/31 705/44 |
| 2014/0143784 A1 | 5/2014 | Mistry et al. |
| 2014/0157401 A1 | 6/2014 | Alameh et al. |
| 2014/0282868 A1* | 9/2014 | Sheller ............... G06F 21/31 726/3 |
| 2015/0348380 A1* | 12/2015 | Takayama .......... G08B 13/14 340/568.1 |
| 2015/0356285 A1* | 12/2015 | Glaser ................ G06F 21/32 726/7 |

\* cited by examiner

MOBILE DEVICE TO PROVIDE ENHANCED SECURITY BASED UPON CONTEXTUAL SENSOR INPUTS

BACKGROUND

Field

The present invention relates to a mobile device that provides enhanced security based upon contextual sensor inputs.

Relevant Background

User authentication is now commonly required to access a mobile device such as: a smart phone, a tablet, a laptop, etc. A commonly deployed authentication method to authenticate a user to a mobile device is a password. However, with the advance of mobile devices, biometric authentication methods are now being utilized more frequently. For example, a user's fingerprint is now increasingly being utilized as an authentication method with the use of fingerprint authentication sensors in mobile devices.

Unfortunately, even these newer biometric authentication methods (e.g., fingerprint) may still be hacked, utilized with lost or stolen mobile devices, and/or utilized by other devices.

SUMMARY

Aspects of the invention may relate to a mobile device to provide enhanced security based upon contextual sensor inputs. The mobile device may include: a biometric sensor; a contextual sensor; and a processor. The processor may be configured to: determine an authentication score based upon a biometric input received from the biometric sensor; modulate the authentication score based upon a contextual sensor input from the contextual sensor related to an event; and determine if the modulated authentication score falls below a predetermined threshold. If the authentication score falls below the predetermined threshold, the processor may command that a secondary authentication be performed or the destruction of a biometric template.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

As used herein, the term "mobile device" refers to any form of programmable computer device including but not limited to laptop computers, tablets, smartphones, televisions, desktop computers, home appliances, cellular telephones, personal television devices, personal data assistants (PDA's), palm-top computers, wireless electronic mail receivers, multimedia Internet enabled cellular telephones, Global Positioning System (GPS) receivers, wireless gaming controllers, receivers within vehicles (e.g., automobiles), interactive game devices, notebooks, smartbooks, netbooks, mobile television devices, or any computing device or data processing apparatus.

Figure 1:
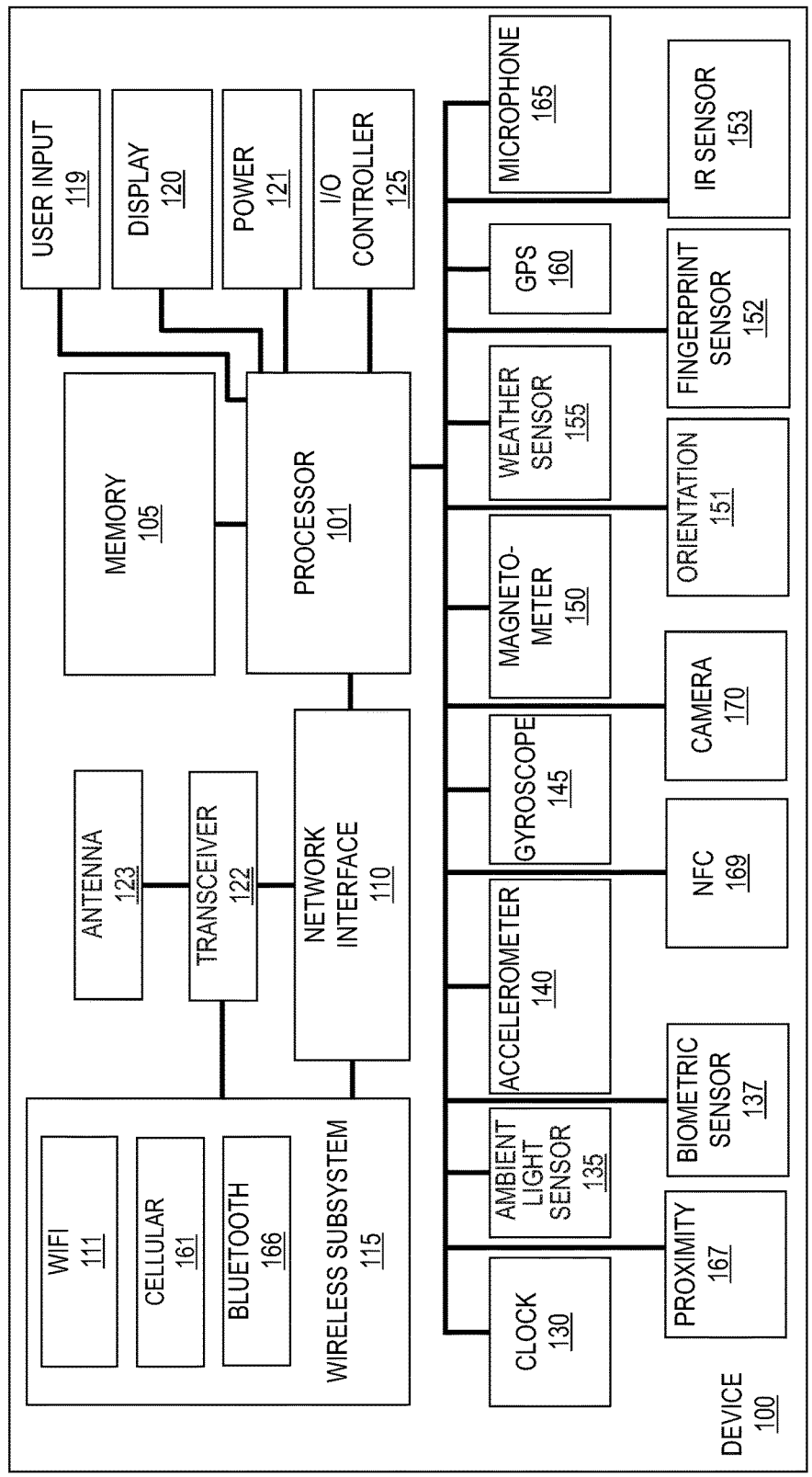
FIG. 1 is a diagram of a device in which aspects of the invention may be practiced.

FIG. 1 is block diagram illustrating an exemplary device in which embodiments of the invention may be practiced. The system may be a computing device (e.g., a mobile device 100), which may include one or more processors 101, a memory 105, I/O controller 125, and network interface 110. Mobile device 100 may also include a number of sensors coupled to one or more buses or signal lines further coupled to the processor 101. It should be appreciated that mobile device 100 may also include a display 120 (e.g., a touch screen display), a user interface 119 (e.g., keyboard, touch screen, or similar devices), a power device 121 (e.g., a battery), as well as other components typically associated with electronic devices. In some embodiments, mobile device 100 may be a transportable device, however, it should be appreciated that device 100 may be any type of computing device that is mobile or non-mobile (e.g., fixed at a particular location).

Mobile device 100 may include sensors such as: a clock 130, ambient light sensor (ALS) 135, biometric sensor 137 (e.g., blood pressure monitor, etc.), accelerometer 140, gyroscope 145, magnetometer 150, orientation sensor 151, fingerprint sensor 152, weather sensor 155 (e.g., temperature, wind, humidity, barometric pressure, etc.), Global Positioning Sensor (GPS) 160, infrared (IR) sensor 153, proximity sensor 167, and near field communication (NFC) sensor 169. Further, sensors may include a microphone 165 and camera 170. Communication components may include a wireless subsystem 115 (Bluetooth 166, Wi-Fi 111, cellular 161), which may also be considered sensors, that are used to analyze the environment (e.g., position) of the device. In some embodiments, multiple cameras are integrated or accessible to the device. For example, a mobile device may have at least a front and rear mounted camera. In some embodiments, other sensors may also have multiple installations or versions.

Memory 105 may be coupled to processor 101 to store instructions for execution by processor 101. In some embodiments, memory 105 is non-transitory. Memory 105 may also store one or more models, modules, engines to implement embodiments described below that are implemented by processor 101. Memory 105 may also store data from integrated or external sensors.

Mobile device 100 may include one or more antenna(s) 123 and a transceiver 122. The transceiver 122 may be configured to communicate bidirectionally, via the antenna(s) and/or one or more wired or wireless links, with one or more networks, in cooperation with network interface 110 and wireless subsystems 115. Network interface 110 may be coupled to a number of wireless subsystems 115 (e.g., Bluetooth 166, Wi-Fi 111, Cellular 161, or other networks) to transmit and receive data streams through a wireless link to/from a wireless network, or may be a wired interface for direct connection to networks (e.g., the Internet, Ethernet, or other wireless systems). Mobile device 100 may include one or more local area network transceivers connected to one or more antennas. The local area network transceiver comprises suitable devices, hardware, and/or software for communicating with and/or detecting signals to/from WAPs, and/or directly with other wireless devices within a network. In one aspect, the local area network transceiver may comprise a Wi-Fi (802.11x) communication system suitable for communicating with one or more wireless access points.

Mobile device 100 may also include one or more wide area network transceiver(s) that may be connected to one or more antennas. The wide area network transceiver comprises suitable devices, hardware, and/or software for communicating with and/or detecting signals to/from other wireless devices within a network. In one aspect, the wide area network transceiver may comprise a CDMA communication system suitable for communicating with a CDMA network of wireless base stations; however in other aspects, the wireless communication system may comprise another type of cellular telephony network or femtocells, such as, for example, TDMA, LTE, Advanced LTE, WCDMA, UMTS, 4G, or GSM. Additionally, any other type of wireless networking technologies may be used, for example, WiMax (802.16), Ultra Wide Band, ZigBee, wireless USB, etc. In conventional digital cellular networks, position location capability can be provided by various time and/or phase measurement techniques. For example, in CDMA networks, one position determination approach used is Advanced Forward Link Trilateration (AFLT).

Thus, device 100 may be a: mobile device, wireless device, cellular phone, personal digital assistant, mobile computer, wearable device (e.g., head mounted display, wrist watch, virtual reality glasses, etc.), internet appliance, gaming console, digital video recorder, e-reader, robot navigation system, tablet, personal computer, laptop computer, or any type of device that has processing capabilities. As used herein, a mobile device may be any portable, or movable device or machine that is configurable to acquire wireless signals transmitted from, and transmit wireless signals to, one or more wireless communication devices or networks. Thus, by way of example but not limitation, mobile device 100 may include a radio device, a cellular telephone device, a computing device, a personal communication system device, or other like movable wireless communication equipped device, appliance, or machine. The term "mobile device" is also intended to include devices which communicate with a personal navigation device, such as by short-range wireless, infrared, wire line connection, or other connection—regardless of whether satellite signal reception, assistance data reception, and/or position-related processing occurs at the device 100. Also, "mobile device" is intended to include all devices, including wireless communication devices, computers, laptops, etc., which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile device."

It should be appreciated that embodiments of the invention as will be hereinafter described may be implemented through the execution of instructions, for example as stored in the memory 105 or other element, by processor 101 of mobile device 100 and/or other circuitry of device and/or other devices. Particularly, circuitry of the device, including but not limited to processor 101, may operate under the control of a program, routine, or the execution of instructions to execute methods or processes in accordance with embodiments of the invention. For example, such a program may be implemented in firmware or software (e.g. stored in memory 105 and/or other locations) and may be implemented by processors, such as processor 101, and/or other circuitry of device. Further, it should be appreciated that the terms processor, microprocessor, circuitry, controller, etc., may refer to any type of logic or circuitry capable of executing logic, commands, instructions, software, firmware, functionality and the like. The functions of each unit or module within the mobile device 100 may also be implemented, in whole or in part, with instructions embodied in a memory, formatted to be executed by one or more general or application-specific processors.

Embodiments of the invention may relate to an apparatus and method to enhance security on a biometric enabled mobile device. In particular, as will be described hereinafter, mobile device 100 having biometric authentication features, under the control of processor 101, may implement methods to enhance the security of the biometric enabled mobile device based upon contextual sensor inputs.

Various terminologies will be described to aid in the understanding of aspects of the invention. Sensor inputs may refer to any input from any of the previously described sensors, such as: clock 130, ambient light sensor (ALS) 135, biometric sensor 137 (e.g., blood pressure monitor, etc.), accelerometer 140, gyroscope 145, magnetometer 150, orientation sensor 151, fingerprint sensor 152, weather sensor 155 (e.g., temperature, wind, humidity, barometric pressure, etc.), Global Positioning Sensor (GPS) 160, infrared (IR) sensor 153, microphone 165, proximity sensor 167, near field communication (NFC) sensor 169, camera 170, etc.

In particular, some of the sensor inputs may be referred to a biometric sensor inputs from biometric sensors, which may include: fingerprint sensor 152 (e.g., fingerprint input), touch-screen 120 (e.g., fingerprint input), touch-screen 120 (e.g., hand geometry), pressure sensors, microphone 165 (e.g., voice scan), camera 170 (facial scan), IR sensor 153 (iris scan), etc. It should be appreciated these are just example of biometric sensor inputs and biometric sensors and that a wide variety of additional sensor inputs may be utilized. For example, other biometric sensors 137 may be utilized, such as, a blood pressure sensor.

Further, contextual information or contextual inputs may refer to the current environment or current events that the mobile device 100 is currently in as monitored by "contextual sensor". Therefore, a contextual sensor may be considered to be any type of sensor that relates to the current context situation (i.e., current events) of the mobile device which may relate to such contextual sensing information as: light; acceleration; weather; orientation; location, proximity, sound, etc. Accordingly, examples of contextual sensors may include: ambient light sensor 135; accelerometer 140; weather sensor 155; orientation sensor 151; GPS 160, proximity sensor 167; microphone 165, etc. These merely being examples of context inputs and contextual sensors. Also, contextual inputs may also be characterized as data collected about the user, such as: transaction amounts during purchases, user spending data, crowd source data, demographic data, websites visited, emails, phone calls made, files opened, networks used, applications used, etc.

Embodiments of the invention may relate to an apparatus and method to enhance security on a biometric enabled mobile device. In particular, as will be described hereinafter, mobile device 100, under the control of processor 101, may implement methods to enhance the security of the biometric enabled mobile device based upon contextual sensor inputs.

As previously described, mobile device 100 may include one or more biometric sensors, as well as, as one or more contextual sensors. Processor 101 may be configured to: determine an authentication score based upon biometric input received from a biometric sensor; modulate the authentication score based upon contextual sensor input received from a contextual sensor related to an event; and determine if the modulated authentication score falls below a predetermined threshold. If the modulated authentication score falls below the predetermined threshold, the processor may command that a secondary authentication be performed or the destruction of a biometric template. Further, if the modulated authentication score falls below the predetermined threshold other actions may be initiated such as reduced access to data or functions or reduced user authorization (e.g., purchasing power). As one example, if the modulated authentication score falls below the predetermined threshold, the mobile device 100 may only be permitted to make emergency calls and local calls but is not permitted to access the contacts call list or to make long distance calls. As another example, if the modulated authentication score falls below the predetermined threshold, the mobile device 100 may only be permitted to make purchases of $100 or less but not more. It should be appreciated that a wide variety of different types of restrictions to a user's accessibility to data and functionality of the mobile device 100 may be applied. Further, as will be described, the authentication score may be modulated in a continuous manner for comparison with the predetermined threshold to determine the user's accessibility to data and functions of the mobile device 100. Various examples of these types of implementations will be described in more detail hereinafter.

As previously described, the biometric sensor may be a soft biometric sensor configured to monitor a plurality of different types of biometric inputs. As examples, these may include a touch-screen 120 (e.g., fingerprint scan, finger geometry, hand geometry, etc.), microphone 165 (e.g., voice scan, vocal password, etc.), camera 170 (e.g., facial scan, hand scan, etc.). Further, hard biometric sensors may relate to sensors that are configured to only monitor a particular biometric input, such as, fingerprint sensor 152 that is a pre-defined sensor to only scan fingerprints. A wide variety of hard biometric sensors 137 may be utilized. Example of hard biometric sensor may include: blood pressure sensor, iris scan sensor, etc.

As previously described, contextual sensor inputs may be inputs from a contextual sensor related to an event and/or may include at least one of current user input data, previous user input data, websites visited, demographic data, etc. As previously described, a "contextual sensor" may be considered to be any type of sensor that relates to current context situation related to events of the mobile device which may relate to such sensing information as: light; acceleration; weather; orientation; location; proximity; sound; etc. Accordingly, examples of contextual sensors may include; ambient light sensor 135; accelerometer 140; weather sensor 155; orientation sensor 151; GPS 160; proximity sensor 167; microphone 165; etc.

Figure 2:
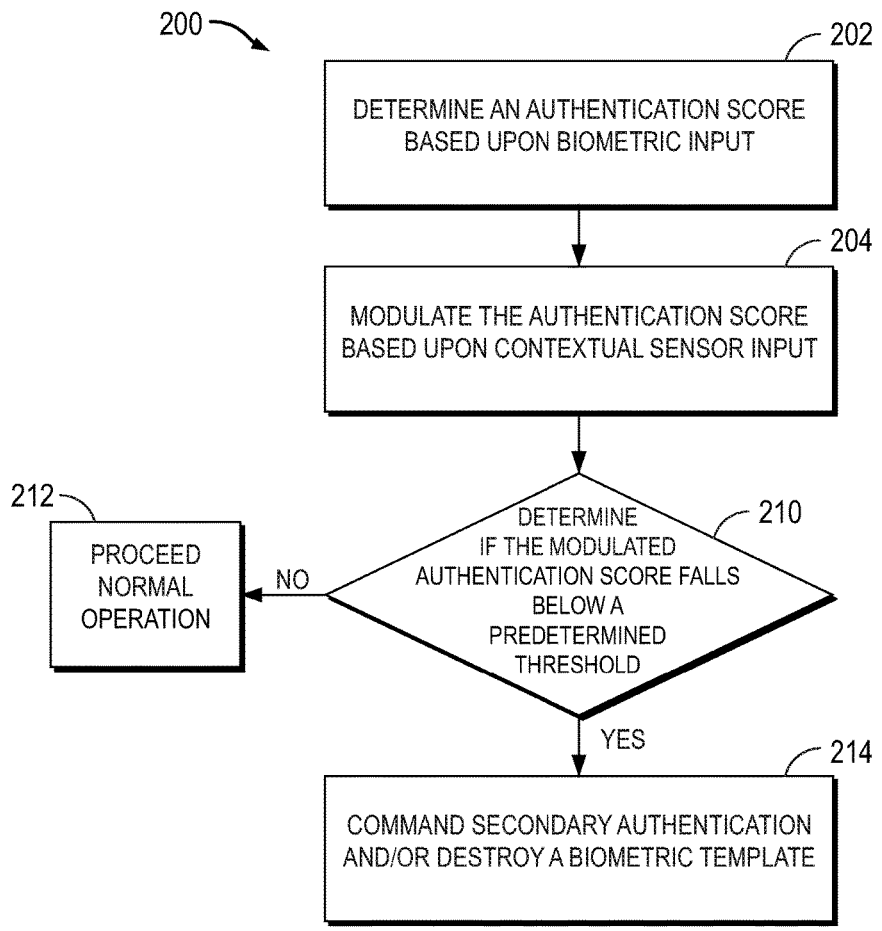
FIG. 2 is flow diagram illustrating a process to enhance authentication.

With brief additional reference to FIG. 2, a process 200 to enhance security of a biometric enabled mobile device will be briefly described. In one embodiment, an authentication score based upon a biometric input from a biometric sensor may be determined (Block 202). Next, the authentication score may be modulated based upon a contextual sensor input received from a contextual sensor related to an event (Block 204). At block 210, process 200 determines if the modulated authentication score falls below a predetermined threshold. If not, normal operations proceed (Block 212). If so, a secondary authentication may be commanded and/or a biometric template may be destroyed. Further, in one embodiment, if the modulated authentication score falls below a predetermined threshold, the mobile device may be disabled or killed. In one example, a kill switch may be implemented. Particular examples of these embodiments will be hereinafter described in more detail.

Figure 3:
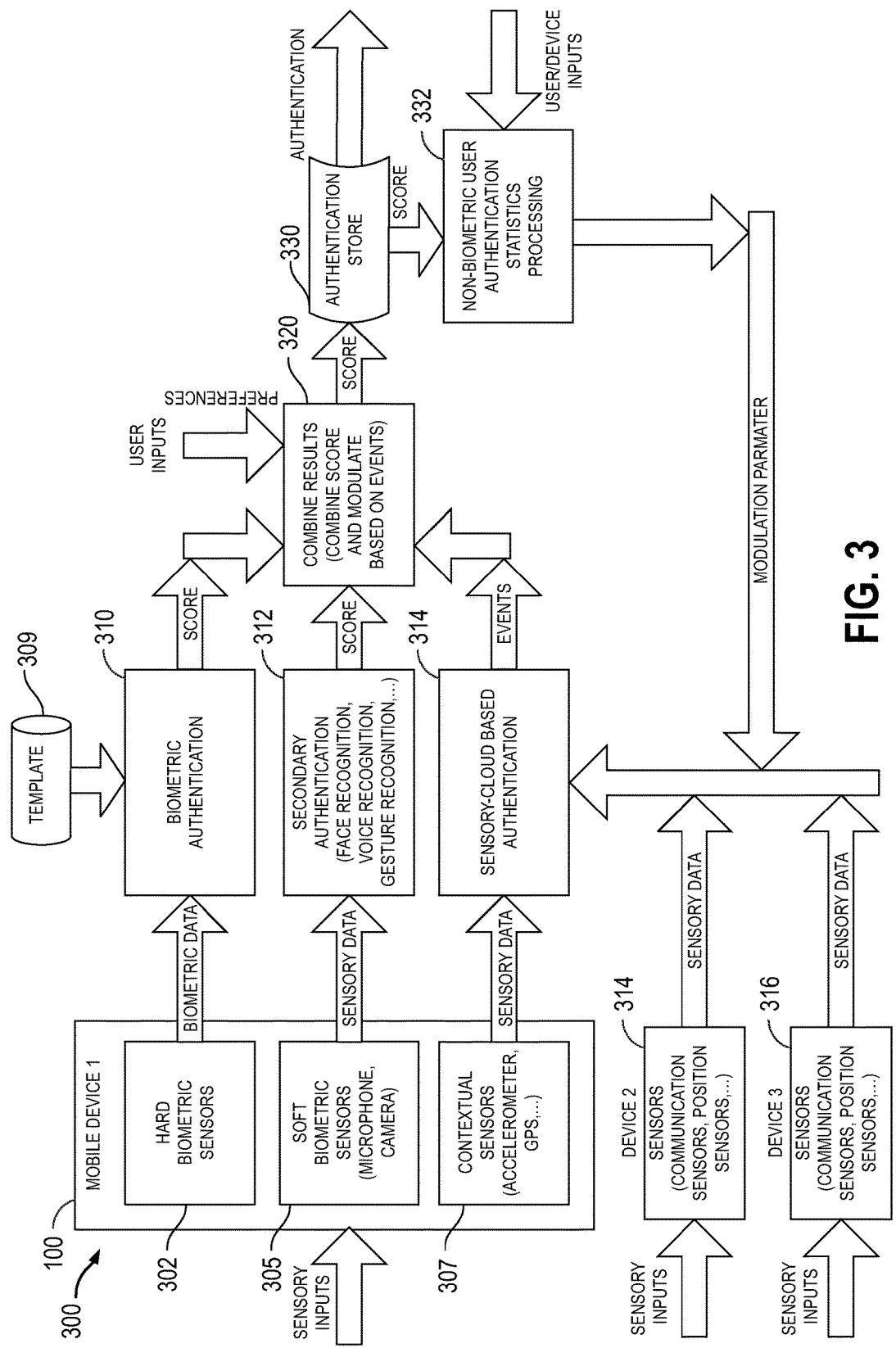
FIG. 3 is block diagram illustrating biometric and contextual sensors utilized in authentication.

With brief additional reference to FIG. 3, in one embodiment, mobile device 100 may include hard biometrics sensors 302, soft biometric sensors 305, and contextual sensors 307, as previously described. Further, one or more paired devices (e.g. paired device 2 314 and paired device 3 316) including sensors may also be coupled to mobile device 100 for authentication purposes. It should be appreciated that paired devices 314 and 316 may include the same types of sensors as the mobile device 100 including hard biometrics sensors 302, soft biometric sensors 305, and contextual sensors 307, as previously described, in detail.

As an example, biometric data from a hard biometric sensor 302 may be provided to a biometric authentication module 310 in which the biometric data from the hard biometric sensor is compared to the pre-stored template 309 for the biometric data. An example of this may be a fingerprint scan from a fingerprint sensor that is compared to the fingerprint template. Based upon the comparison of the scanned biometric data to the pre-stored template 309, a score is calculated, and the score is transmitted to the combined authentication score determiner module 320. Further, soft biometric sensors 305 may provide sensor data to a secondary authentication module 312. Secondary authentication module 312 may determine a score based upon the sensor data and the score may be transmitted to the combined authentication score determiner module 320. An example of this may be soft biometric data (e.g. face recognition scan via camera 170, voice recognition scan via microphone 165, etc.) that may be compared to pre-stored soft biometric authentication data and, based upon the comparison to the pre-stored authentication data, secondary authentication module 312 may calculate a score that is transmitted to combined authentication score determiner module 320.

Further, sensor data collected via contextual sensors 307 based upon events (e.g. location via GPS 160, movement/acceleration via accelerometer 140, etc.) may be collected as sensor data and transmitted to sensor-cloud based authentication module 314. Additionally, contextual sensor data collected from paired devices 314 and 316 may be collected and also transmitted to sensor-cloud based authentication module 314. Moreover, other types of sensor data from hard biometric sensors and soft biometric sensor of paired devices 314 and 316 may be collected and may be transmitted to sensor-cloud based authentication module 314. Also, non-biometric user authentication statistic based processing may also be collected and transmitted to sensory-cloud based authentication module 314. Based upon this collected contextual sensor data based upon events, sensor-cloud based authentication module 314 may transmit this sensor data to the combined authentication score determiner module 320. Particular examples of these embodiments will be hereinafter described in more detail.

Combined authentication score determiner module 320 based upon the scores received from the hard biometric authentication module 310 and the scores received from secondary authentication module 312 may combine these authentication scores and may further modulate these authentication scores based upon the contextual sensor input data related to events from the mobile device 100 itself, as well as sensor data from paired devices 314 and 316, as collected by the sensory-cloud based authentication module 314, to calculate a complete modulated authentication score 330. It should be appreciated that authentication score determiner module 320 may determine a modulation factor based upon the events from the mobile device 100 itself and from the sensor data from the paired devices 314 and 316 to modulate or change the authentication score (e.g., increase or decrease). As an example, the modulation factor may be a percentage increase or decrease (5%, 10%, 15%, etc.) to the authentication score based upon the contextual event data or other sensor data from the mobile device 100 and/or the paired devices 314 and 316 to increase or decrease (e.g., by a percentage basis) the authentication score to calculate the complete authentication score 330. Further, user input preferences or authentication entity preferences (e.g., from another device, on-line website, on-line service provider (bank, store, government entity, healthcare provider), etc.) may set preferences for the types of hard biometric sensor data, soft biometric sensor data, and contextual sensor input data for the mobile device 100 itself (and paired devices 314 and 316) which may also be inputted and utilized by the combined authentication score determiner module 320 to determine the complete authentication score 330. This authentication score 330 may then be utilized for authentication. For example, if the authentication score 330 falls below a predetermined threshold (e.g., hereinafter referred to as predetermined trust threshold) then secondary authentication may be commanded. For example, the user may be required to use an additional hard biometric sensor (e.g., an iris scan) and/or another soft biometric sensor, such as, a voice scan (e.g., name, password, etc.) to the microphone, etc. As another particular example, if the authentication score falls below a predetermined trust threshold, the biometric input 309 utilized (e.g., the fingerprint scan) may be found to be fraudulent and the fingerprint biometric template 309 destroyed. Additionally, if the authentication score 330 falls below a predetermined trust threshold, the mobile device 100 may be disabled (e.g., killed). It should be appreciated that the authentication score may be calculated as a numerical range (e.g., 0-10, 1-100, etc.) or a score level range (e.g., low, medium, high) for a comparison against a similarly defined predetermined trust threshold. It should be appreciated that these are merely examples and that any type of authentication scoring system may be utilized.

It should be appreciated that: previous authentication scores; user/device inputs; non-biometric user authentication statistics 332; etc.; may also be utilized by sensory-cloud based authentication module 314 for use as modulation parameters. Also, it should be appreciated that the previously-described modules may be implemented by the processor of the mobile device itself for authentication scoring and/or may be communicated to another device for authentication scoring. Additionally, it should be appreciated that the paired devices 314 and 316 may be any type of paired device (e.g., another tablet, another smart phone, a watch, a headset, a biometric device, etc.). Any type of pairing device may be utilized. Also, in one embodiment, the primary mobile device 100 may disable itself based upon a disable command received from one of the paired devices 314 and 316. It should be appreciated that although two paired devices 314 and 316 are shown for illustrative purposes that any number of paired devices may be utilized in conjunction with a primary mobile device 100. It should further be appreciated that paired devices 314 and 316 may include the same and/or different types of sensors as the mobile device 100 including hard biometrics sensors 302, soft biometric sensors 305, and contextual sensors 307, as previously described, in detail. The sensors of the paired devices 314 and 316 may be utilized in cooperation with mobile device 100 for authentication purposes and to enhance the security of the mobile device 100. Various examples of the uses of the sensors of the paired devices 314 and 315 for authentication purposes and to enhance the security of the mobile device 100 will described with reference to FIGS. 4 and 5, along with various other examples.

Figure 4:
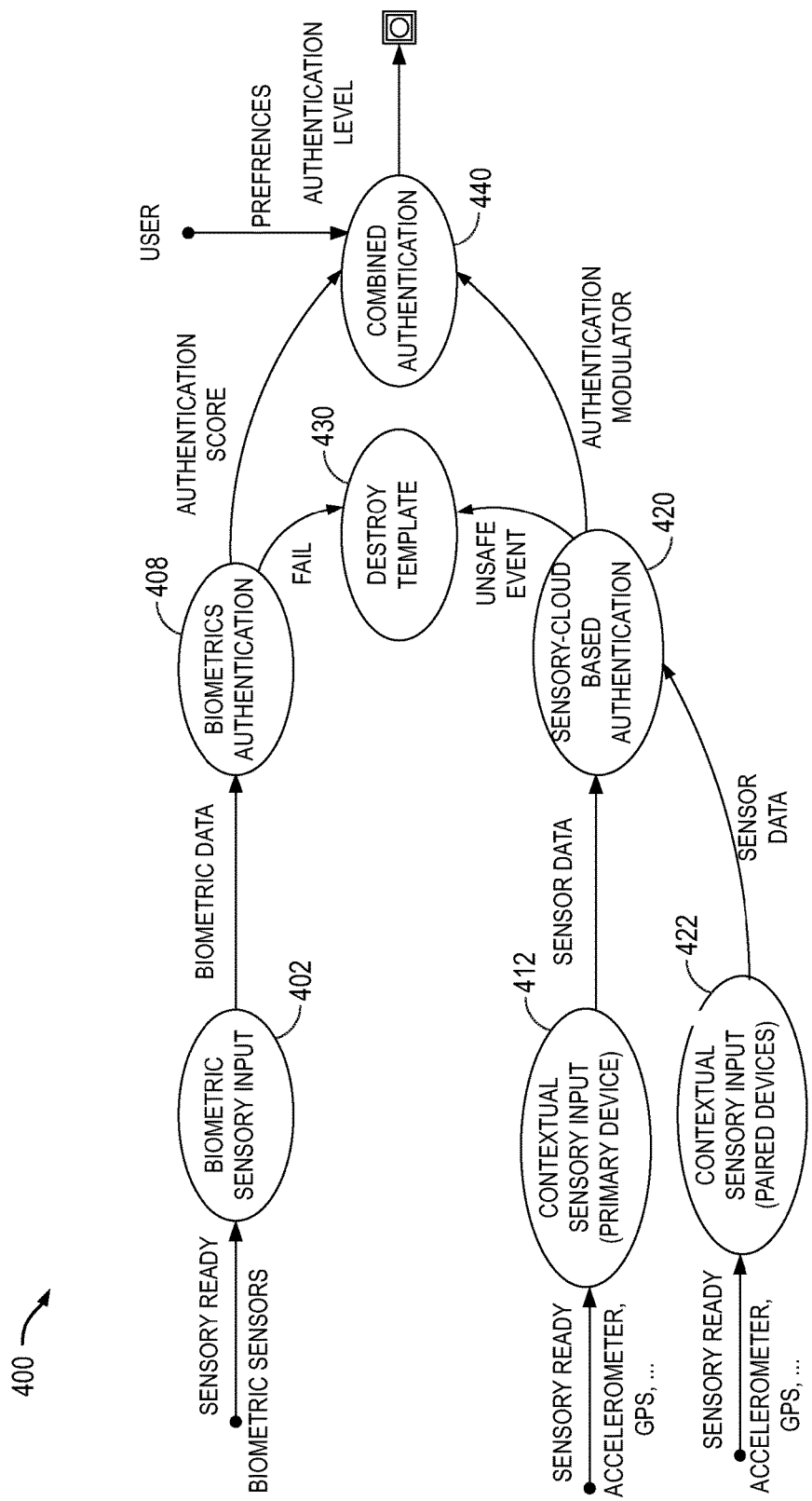
FIG. 4 is a diagram illustrating state transitions for the authentication process.

With brief additional reference to FIG. 4, a high level state transition diagram 400 illustrating embodiments will be described. For example, at state 402, biometric sensory data input is received from biometric sensors such that biometric sensory data is collected (e.g., fingerprint, facial scan, voice scan, etc.) and transmitted to biometric authentication module 408. Further, contextual sensory input data, at state 412, from contextual sensors 307 (e.g., location, motion, acceleration, etc.) from the primary mobile device 100 is collected and transmitted to sensory-cloud based authentication module 420. Moreover, contextual sensory input data from paired devices, at state 422, is collected and transmitted to sensory-cloud based authentication module 420. Biometric authentication module 408 may determine an authentication score for the biometric authentication data and may transmit the authentication score to the combined authentication module 440. On the other hand, biometric authentication module 408 may determine that the template for the biometric sensor should be destroyed (destroy template state 430). Further, the sensory-cloud based authentication module 420 may determine an unsafe event has occurred and may determine that the template for the biometric sensor should be destroyed (destroy template state 430). On the other hand, the sensory-cloud based authentication module 420 may transmit an authentication modulator to the combined authentication module 440 based upon the contextual inputs related to events from both the primary device and the paired devices. Again, the combined authentication module 440 may be modulated by user preferences.

Combined authentication module 440 may modulate the authentication score from the biometric authentication module 408 based upon the authentication modulator data from the sensor-cloud based authentication module 420, which is based upon contextual sensor input from the contextual sensors related to events from both the primary device and/or the paired devices. Again, when the authentication level falls below a predetermined trust threshold, a secondary authentication may be commanded or a biometric template may be destroyed.

Figure 5A:
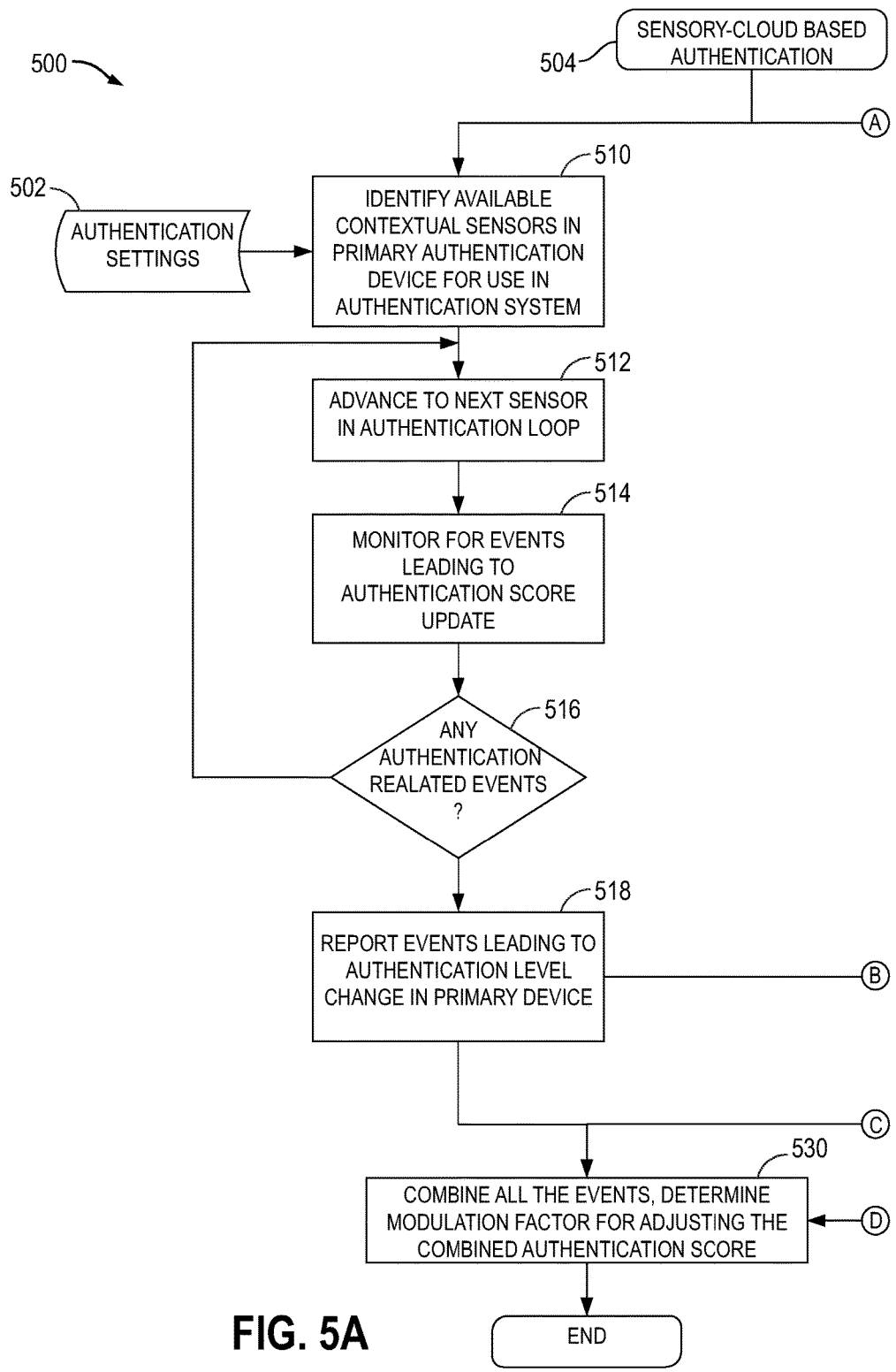
FIG. 5A and FIG. 5B are a flow diagram illustrating the authentication process.
Figure 5B:
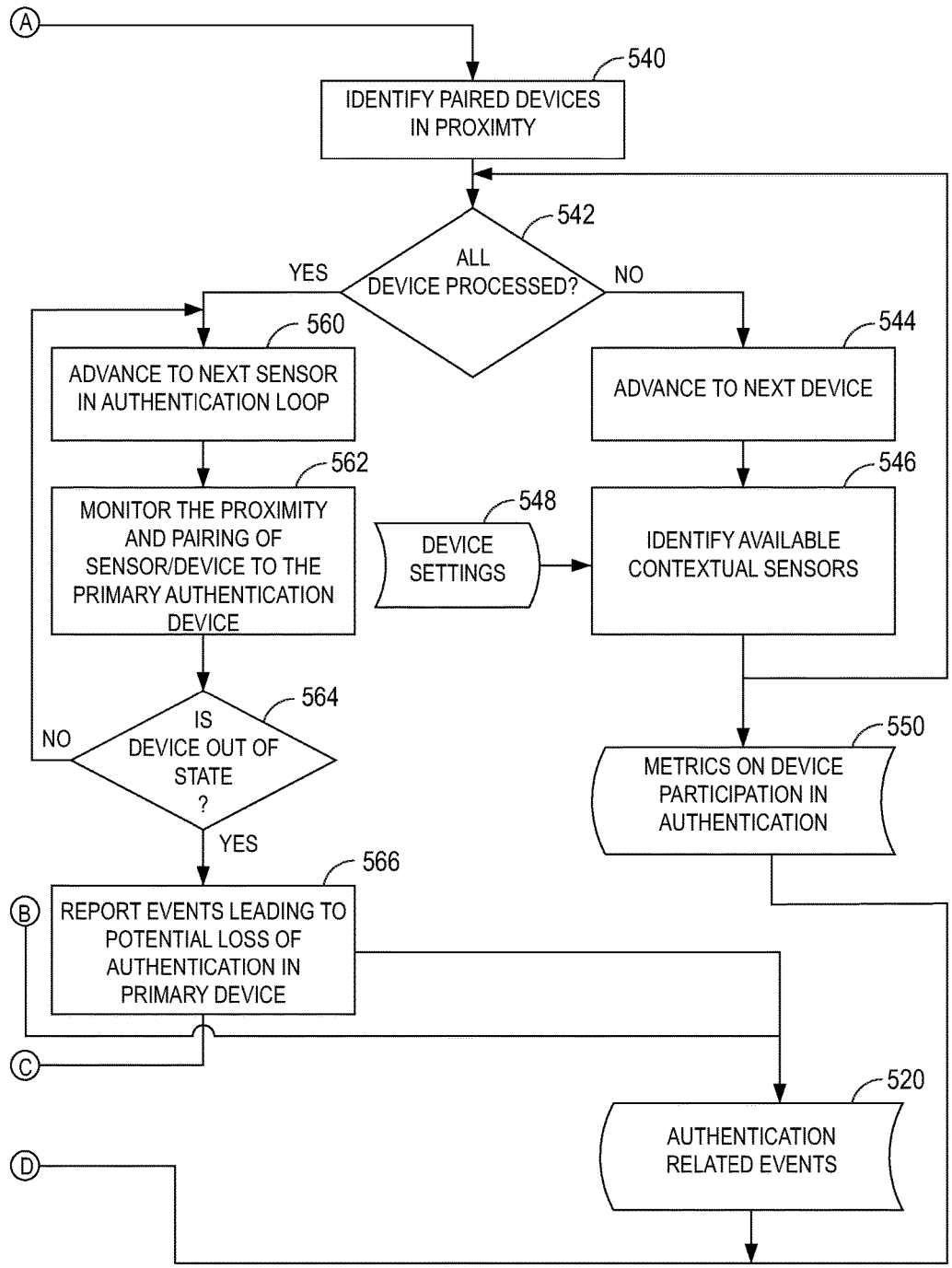

With brief additional reference to FIG. 5, a flowchart illustrating a process 500 for enhancing security in a biometric enabled mobile device will be described. To begin with, authentication settings 502 may be established for the primary mobile device 100 and sensory-cloud based authentication 504 may be continuously provided to the primary mobile device 100 and the paired devices (e.g. paired device 314, paired device 316, etc.), as previously described. Looking at the primary mobile device 100, available contextual sensors 307 (e.g., for location, motion, acceleration, etc.) are identified for use in the authentication system. Next, at block 512 the next sensor in the authentication loop is advanced to. Then, at block 514, events are monitored for leading to an authentication score update. At block 516, if there are any authentication related events, process 500 moves to block 518, if not, process 500 moves back to block 512. In particular, at block 518, events leading to authentication level change in the primary device 518 (e.g., drastic change in location, motion, acceleration, etc.) are recorded as authentication related event (block 520) and, in particular, are combined in the authentication combiner module 320, at block 530, in which a modulation factor is determined as previously described (based on a combination of all the events), and the authentication score is adjusted by the modulation factor to determine a combined authentication score 330. In particular, at block 530, as previously described, the authentication score is modulated based upon contextual sensor inputs from contextual sensors that are related to an event for adjusting the combined authentication score that is based upon biometric authentication inputs. The modulation factor may also be based upon the use of paired devices as will be described.

Looking at paired devices, at block 540 paired devices are identified that are in proximity to the primary device 100. At block 542, process 500 determines whether all the devices have been processed. If not, process 500 advances to the next device (block 544). Then, available contextual sensors are identified for use by the authentication system. This is also based upon the device settings of the paired device (block 548). In this way, the metrics on the paired device may participate in the authentication process (block 550) as they are forwarded on to the authentication combiner module 320 (block 530) for use in determining the modulation factor. On the other hand, if all of the paired devices have been processed (block 542), then the next sensor in the authentication loop is advanced to (block 560), and the proximity and pairing of sensors/devices to the primary authentication device are monitored (block 562). If the paired device is not out of state (block 564), this process continues. However, if the paired device is out of state, then the events leading to the potential loss of authentication in the primary device is reported (block 566) (e.g., user moved away from primary device as detected by paired device (e.g., watch, etc.)) to the to the authentication combiner module 320 (block 530) for use in determining the modulation factor.

Again, at this point, with reference again to block 530, a combined authentication score can be determined based upon a plurality of factors. These factors include an authentication score based upon biometric input data received from both hard biometric sensors 302 (e.g., fingerprint sensor), as well as, soft biometric sensors 305 (e.g., face recognition from a camera, voice recognition from a microphone, etc.). Further, these authentication scores may be modulated based upon contextual sensor input from contextual sensors related to an event. These contextual inputs may be related to location, motion, acceleration, user data input, etc., from contextual sensors 307 of the primary device 100 itself, as previously described. Further, the authentication score may be further modulated based upon contextual sensor input from the contextual sensors of paired devices 314 and 316 (e.g., location, acceleration, position, motion, etc.) of paired devices as well as other sensor data from paired devices. Based upon all of this inputted data, and the combining of events, in order to determine the modulation factor, the combined authentication scores from the biometric sensors may be adjusted by the modulation factor to determine the overall authentication score. If the authentication score falls below a predetermined trust threshold, then a secondary authentication may be commanded (e.g., a different type of authentication, such as eye scan, vocal scan, etc.) as well as other functions, such as, destroying a biometric template, or even disabling/killing the mobile device. It should be appreciated that the biometric template destroyed may be a particular template from a particular biometric sensor, such as a fingerprint template for a fingerprint sensor. Also, in one embodiment, a paired device may disable the mobile device based upon a disable command from the paired device.

Some particular examples illustrating the functionality of FIGS. 3-5, will be hereinafter described. As has been previously described, the authentication system 300 may be configured to determine if the modulated authentication score 330 falls below a threshold, and if so, appropriate action may be taken. Examples of these types of actions include a wide variety of different types of restrictions to a user's accessibility to data and functions of the mobile device. Examples of these types of actions may include reduced access to data or functions of the mobile device or reduced access to external entities that require authentication (e.g., another device, an on-line service provider (bank, store, healthcare), etc.). Other examples of types of action may include reduced access to data or reduced user authorization (e.g., purchasing power). Other examples of types of action may include a command that a secondary authentication be performed or that a biometric template be destroyed or that a mobile device be disabled or that a mobile device be reported as stolen, etc.

As has been described, the authentication score 330 may be modulated in a continuous manner based upon hard biometric sensor scores 302 (e.g., fingerprint sensor), soft biometric sensor scores 305 (e.g., face recognition from a camera, voice recognition from a microphone, etc.), and contextual sensor events/scores 307 (e.g., location, motion, acceleration, user data input, etc.). These continuously updated combined authentication scores 330 may be compared against continuously updated thresholds to determine whether authentication should be granted and/or what level of access should be granted. As has been described, if the modulated authentication score 330 falls below a threshold, actions may be initiated such as reduced access to data and functions or reduced user authorization (e.g., purchasing power). As one example, if the modulated authentication score 330 falls below the predetermined threshold, the mobile device 100 may only be permitted to make emergency calls and local calls but is not permitted to access the contacts call list or to make long distance calls. As another example, if the modulated authentication score 330 falls below the predetermined threshold, the mobile device 100 may only be permitted to make purchases of $100 or less but not more. It should be appreciated that these are merely example. Other types of examples will be hereinafter described.

As one example, with particular reference to FIG. 3, a hard biometric fingerprint sensor 302 may receive a fingerprint scan for biometric authentication 310 that matches the template 309 providing a very high authentication score to the combined authentication score determiner module 320. However, the soft biometric voice sensor data from the microphone 305 for secondary authentication module 312 is very low (the voice has a very low matching factor to the voice template) such that a low authentication score is transmitted to the combined authentication score determiner module 320. Moreover, the contextual sensor 307 monitoring user input has monitored recent access to websites that have never been visited before. Based upon this data, the combined authentication score determiner module 320 determines a combined authentication score 330 that is much lower than the threshold for the mobile device 100. In this example, the mobile device perform actions to reduce access to data and functions for the user. As one example, the mobile device may reduce user authorization (e.g., purchasing power). In particular, the mobile device 100 may only be permitted to make purchases of $100 or less, but not more, to external entities (e.g., a store website). However, over time, due to the continuous nature of generating the combined authentication score, the combined authentication score 330 may increase back to a suitable level (e.g., based upon the user's voice matching the voice template), to become greater than the trust threshold such that full access to data and functions for the user is restored including user authorization (e.g., purchasing power), such that the user can engage in unrestricted purchases (e.g., on a store website).

As another example, with particular reference to FIG. 3, a hard biometric fingerprint sensor 302 may receive a fingerprint scan for biometric authentication 310 that matches the template 309 providing a very high authentication score to the combined authentication score determiner module 320. However, the soft biometric camera sensor data from the camera 170 for secondary authentication module 312 is very low (the facial picture has a very low matching factor to the face template) such that a low authentication score is transmitted to the combined authentication score determiner module 320. Moreover, the contextual sensor 307 via the GPS sensor provides a location of the mobile very different than normal (e.g., out of county). Based upon this data, the combined authentication score determiner module 320 determines a combined authentication score 330 that is much lower than the threshold for the mobile device 100. In this example, the mobile device may perform actions to reduce access to data and functions for the user. For example, the mobile device may only be permitted to make emergency calls and local calls but is not permitted to access the contacts call list or to make long distance calls. However, over time, due to the continuous nature of generating the combined authentication score, the combined authentication score 330 may increase back to a suitable level (e.g., based upon the face of the user matching the face template more accurately and the contextual sensor indicating the user is now at an approved location (e.g., near home)), to become greater than the trust threshold, such that full access to data and functions for the user is restored including permitting full access to local and long distance phone calls.

It should be appreciated that these are merely examples and that a wide variety of scenarios are a possible.

Further, mobile device 100 may also command secondary authentication for more complete authentication data, such as an eye scan with the IR sensor and facial scan with the front camera whenever the initial input of hard biometric sensor scores 302, soft biometric sensor scores 305, and contextual sensor events/scores 307, is not sufficient to match the threshold required. For example, if the authentication score 330 falls below a predetermined threshold then secondary authentication may be commanded. For example, the user may be required to use an additional hard biometric sensor (e.g., an iris scan) and/or another soft biometric sensor, such as, a voice scan (e.g., name, password, etc.) to the microphone, etc.

In these examples, if this secondary authentication fails, a wide variety of options are possible. For example, subsequent authentication may be requested. Additionally, a wide variety of different types of restrictions to a user's accessibility to data and functions of the mobile device may be employed, as previously described, such that different levels of access may still be granted.

In one example, if the subsequent authentications continuously fail, a variety of operations may be performed. For example, the mobile device may be disabled. Further, if all of the subsequent authentications have continuously failed, the fingerprint template may be destroyed. For example, it may be assumed that the mobile device 100 has been stolen and/or the fingerprint scan data has been hacked. It should be appreciated that a wide variety of options are possible.

It should be appreciated that, in one example, if a very abrupt event change occurs, the modulation factor for the authentication score may drastically change and drastic action may be taken. For example, if the contextual sensor 307 via the GPS sensor provides a location of the mobile very different than normal (e.g., in a different country) and no user authentication input can authenticate the user, mobile device data may be deleted or encrypted and the mobile device disabled and reported stolen.

Further, in one example, paired device(s) may be utilized in authentication procedures for the mobile device.

As another example, with particular reference to FIG. 3, a hard biometric fingerprint sensor 302 may receive a fingerprint scan for biometric authentication 310 that matches the template 309 providing a very high authentication score to the combined authentication score determiner module 320. However, the contextual sensor 307 of the mobile device via the GPS sensor provides a location of the mobile device very different than the GPS location of previously paired device 314 (e.g., paired 3 hours ago). For example, the GPS location of the mobile device 100 and the GPS location of the previously paired device 314 (e.g., a watch) are now 50 miles apart. Based upon this data, the combined authentication score determiner module 320 determines a combined authentication score 330 that is much lower than the predetermined threshold for the mobile device 100. The mobile device 100 may command secondary authentication with more complete authentication data, such as a voice scan via the microphone. In this example, if this secondary authentication fails, the biometric template 309 for the fingerprint may be destroyed, assuming the mobile device 100 has been stolen and/or the fingerprint scan data has been hacked. In addition, because the authentication score has fallen so far below the predetermined trust threshold and/or the secondary authentication has not been met, the mobile device 100 may be disabled (e.g., a kill switch implemented). As an example, the paired device 314 may issue commands to monitor the primary mobile device 100, to command template destruction, or to disable the mobile device.

As another example, with particular reference to FIG. 3, a soft biometric microphone sensor 305 may receive a voice scan for authentication 312 that barely matches the voice template providing a low authentication score to the combined authentication score determiner module 320. However, the contextual sensor 307 of the mobile device via its GPS sensor provides a location of the mobile device very close to the GPS location of previously paired device 314 (e.g., paired 3 hours ago) based upon the GPS sensor of the paired device 314. On the other hand, the paired device 314 (e.g., a watch) via its microphone sensor recently received a voice scan that highly matches the voice template for the paired device 314. In this example, the paired device 314 provides sensor data that significantly increases the authentication score 330 such that further authentication from the mobile device 100 is not required.

It should be appreciated that these are merely examples of the previously described embodiments. It should be appreciated that aspects of the invention previously described may be implemented in conjunction with the execution of instructions by processors of the devices, as previously described. Particularly, circuitry of the devices, including but not limited to processors, may operate under the control of a program, routine, or the execution of instructions to execute methods, modules, or processes in accordance with embodiments of the invention. For example, such a program may be implemented in firmware or software (e.g. stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale device, a set-top box, or any other suitable device. These devices may have different power and data requirements Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile device comprising:
    a biometric sensor;
    a contextual sensor; and
    a processor configured to:
        determine an authentication score based upon a biometric input received from the biometric sensor;
        modulate the authentication score utilizing a modulation factor determined by a contextual sensor input received from the contextual sensor related to an event; and
        determine if the modulated authentication score falls below a predetermined threshold, and if so, destroying a biometric template.

2. The mobile device of claim 1, wherein, if the modulated authentication score falls below the predetermined threshold, further comprising, disabling the mobile device.

3. The mobile device of claim 1, wherein, the biometric sensor is a soft biometric sensor configured to monitor a plurality of different types of biometric inputs.

4. The mobile device of claim 1, wherein, the biometric sensor is a hard biometric sensor configured to only monitor a particular biometric input.

5. The mobile device of claim 4, wherein, the biometric template destroyed is a particular biometric template for the hard biometric sensor.

6. The mobile device of claim 5, wherein, the biometric template destroyed is a fingerprint biometric template for a hard fingerprint sensor.

7. The mobile device of claim 1, wherein, the contextual sensor input includes at least one of location, movement, or user input.

8. The mobile device of claim 1, wherein, the processor is further configured to:
    receive contextual sensor input from a contextual sensor of a paired device; and
    modulate the authentication score based upon the contextual sensor input from the contextual sensor of the paired device.

9. The mobile device of claim 8, wherein, the processor is further configured to disable the mobile device based upon a disable command received from the paired device.

10. A method comprising:
    determining an authentication score based upon a biometric input received from a biometric sensor;
    modulating the authentication score utilizing a modulation factor determined by a contextual sensor input received from a contextual sensor related to an event; and
    determining if the modulated authentication score falls below a predetermined threshold, and if so, destroying a biometric template.

11. The method of claim 10, wherein, if the modulated authentication score falls below the predetermined threshold, further comprising, disabling the mobile device.

12. The method of claim 10, wherein, the biometric sensor is a soft biometric sensor configured to monitor a plurality of different types of biometric inputs.

13. The method of claim 10, wherein, the biometric sensor is a hard biometric sensor configured to only monitor a particular biometric input.

14. The method of claim 13, wherein, the biometric template destroyed is a particular biometric template for the hard biometric sensor.

15. The method of claim 14, wherein, the biometric template destroyed is a fingerprint biometric template for a hard fingerprint sensor.

16. The method of claim 10, wherein, the contextual sensor input includes at least one of location, movement, or user input.

17. The method of claim 10, further comprising:
    receiving contextual sensor input from a contextual sensor of a paired device; and
    modulating the authentication score based upon the contextual sensor input from the contextual sensor of the paired device.

18. The method of claim 17, further comprising, disabling the mobile device based upon a disable command received from the paired device.

19. A non-transitory computer-readable medium including code that, when executed by a processor, causes the processor to:
    determine an authentication score based upon a biometric input received from a biometric sensor;
    modulate the authentication score utilizing a modulation factor determined by a contextual sensor input received from a contextual sensor related to an event; and
    determine if the modulated authentication score falls below a predetermined threshold, and if so, destroying a biometric template.

20. The computer-readable medium of claim 19, wherein, if the modulated authentication score falls below the predetermined threshold, further comprising code for disabling the mobile device.

21. The computer-readable medium of claim 19, wherein, the biometric sensor is a soft biometric sensor configured to monitor a plurality of different types of biometric inputs.

22. The computer-readable medium of claim 19, wherein, the biometric sensor is a hard biometric sensor configured to only monitor a particular biometric input.

23. The computer-readable medium of claim 22, wherein, the biometric template destroyed is a particular biometric template for the hard biometric sensor.

24. The computer-readable medium of claim 23, wherein, the biometric template destroyed is a fingerprint biometric template for a hard fingerprint sensor.

25. The computer-readable medium of claim 19, wherein, the contextual sensor input includes at least one of location, movement, or user input.

26. The computer-readable medium of claim 19, further comprising code for:
    receiving contextual sensor input from a contextual sensor of a paired device; and
    modulating the authentication score based upon the contextual sensor input from the contextual sensor of the paired device.

27. A mobile device comprising:
    means for determining an authentication score based upon a biometric input received from a biometric sensor;

means for modulating the authentication score utilizing a modulation factor determined by a contextual sensor input received from a contextual sensor related to an event; and means for determining if the modulated authentication score falls below a predetermined threshold, and if so, destroying a biometric template.

28. The mobile device of claim 27, wherein, if the modulated authentication score falls below the predetermined threshold, further comprising means for disabling the mobile device.

29. The mobile device of claim 27, wherein, the biometric template destroyed is a fingerprint biometric template for a hard fingerprint sensor.

30. The mobile device of claim 27, wherein, the contextual sensor input includes at least one of location, movement, or user input.

* * * * *